US012762398B2

(12) United States Patent
Herman et al.

(10) Patent No.: US 12,762,398 B2
(45) Date of Patent: Oct. 13, 2026

(54) VEHICLE SENSOR DATA ACQUISITION

(71) Applicant: Ford Global Technologies, LLC, Dearborn, MI (US)

(72) Inventors: David Michael Herman, West Bloomfield, MI (US); Shaheer Zafar, Chicago, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 995 days.

(21) Appl. No.: 18/047,310

(22) Filed: Oct. 18, 2022

(65) Prior Publication Data

US 2024/0127048 A1 Apr. 18, 2024

(51) Int. Cl.

*G06N 3/08* (2023.01)
*G06N 3/045* (2023.01)
*G07C 5/00* (2006.01)

(52) U.S. Cl.

CPC ............... *G06N 3/08* (2013.01); *G06N 3/045* (2023.01); *G07C 5/008* (2013.01)

(58) Field of Classification Search

CPC ........... G06N 3/08; G06N 3/045; G07C 5/008
See application file for complete search history.

(56) References Cited

U.S. PATENT DOCUMENTS 10,696,298 B2 * 6/2020 Movert ............. B60W 60/0027
10,852,721 B1 * 12/2020 Smith ................. G06F 11/3684
2017/0132334 A1 * 5/2017 Levinson .............. B60W 50/00
2018/0336297 A1 * 11/2018 Sun ........................ G01M 17/00
2021/0103795 A1 * 4/2021 Buesser ................. G06N 20/00
2021/0116915 A1 * 4/2021 Jiang ..................... G08G 1/0112
2021/0166474 A1 * 6/2021 Behar ...................... G06T 19/20
2021/0286068 A1 * 9/2021 Kumar ................... G09B 9/006
2021/0294944 A1 * 9/2021 Nassar ................. G05D 1/0088
2021/0295171 A1 * 9/2021 Kamenev ............. G06N 3/0455
2022/0373661 A1 * 11/2022 Lee ......................... G01S 7/497
2023/0359208 A1 * 11/2023 Mueller .................. F41H 13/00

* cited by examiner

*Primary Examiner* — Lewis A Bullock, Jr.
*Assistant Examiner* — Theodore E Hebert
(74) *Attorney, Agent, or Firm* — Christopher Storms; Brooks Kushman P.C.

(57) ABSTRACT

A system is disclosed that includes a computer that includes a processor and a memory, the memory including instructions executable by the processor to acquire real world sensor data from a mobile platform for a first time period. The real world sensor data from the mobile platform can be input to a first neural network to predict sensor data of the mobile platform for a second time period that is prior to the first time period. The predicted sensor data and the real world sensor data can be input to a simulation of the mobile platform; wherein the simulation outputs predicted real world operation of the mobile platform based on the predicted sensor data for the second time period and the real world sensor data for the first time period.

20 Claims, 7 Drawing Sheets

VEHICLE SENSOR DATA ACQUISITION

BACKGROUND

Images can be acquired by sensors and processed using a computer to determine data regarding objects in an environment around a mobile system. Operation of a mobile system can include acquiring accurate and timely data regarding objects in the system's environment. A computer can acquire data including images from one or more sensors including image sensors that can be processed to determine data regarding objects. Data regarding objects in a mobile system's environment can be used by a computer to operate a mobile system. Mobile systems can include vehicles, robots, and drones.

DETAILED DESCRIPTION

Figure 1:
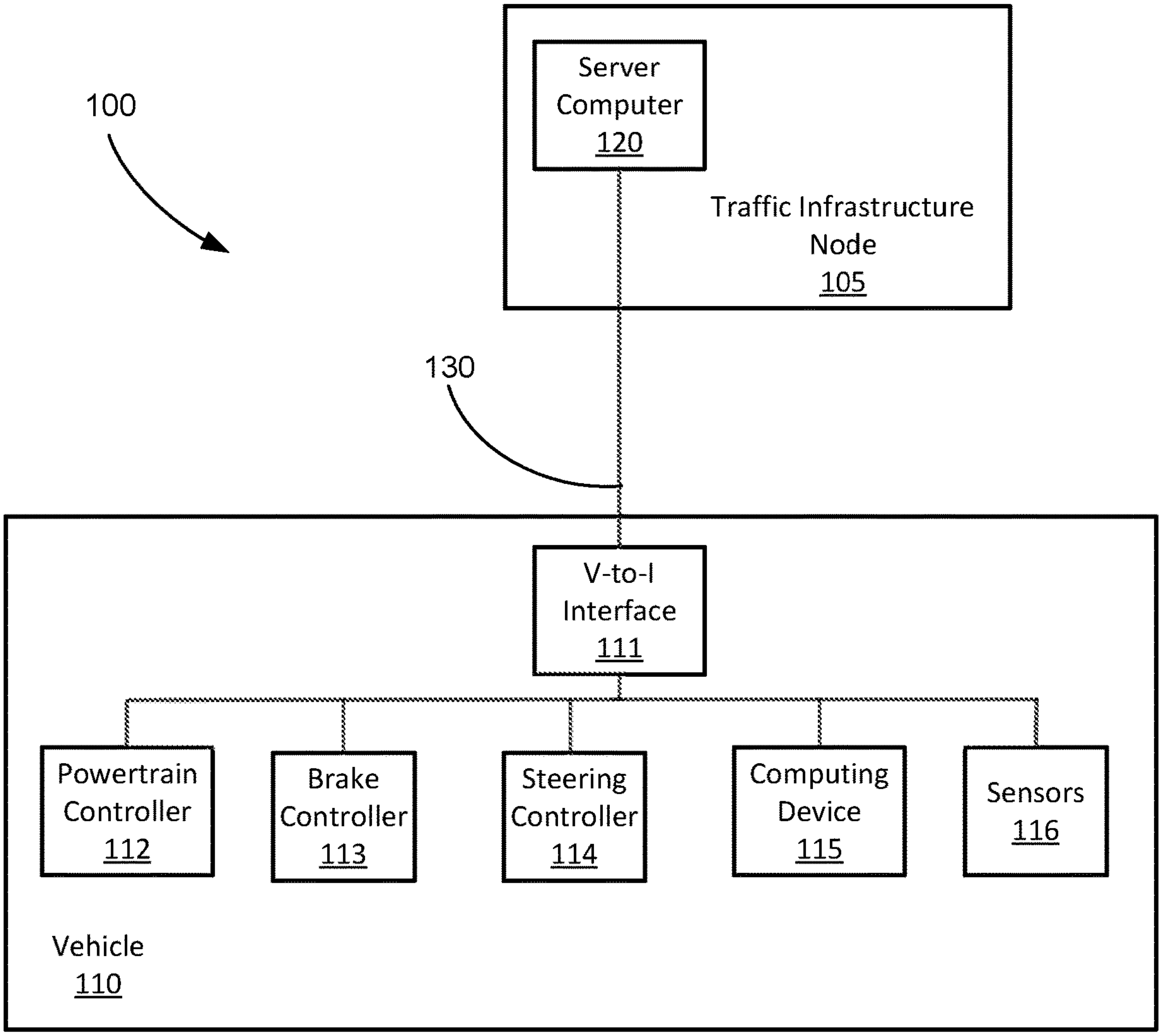
FIG. 1 is a block diagram of an example traffic infrastructure system.

As described herein, one or more software programs executing on a computer in a mobile system can be used to operate the mobile system based on processing sensor data regarding conditions internal to the mobile system and an environment around the mobile system. For example, sensors can acquire data regarding states included in one or more computers, controllers, actuators included in the mobile system. Sensors can also acquire data regarding an environment around the mobile system. Developing and testing software programs that control systems can include acquiring and recording sensor data during operation of the system to permit evaluation of system performance and re-simulation of system operation to permit further development and testing of the hardware and software programs included in the mobile system. An example of operating a mobile system based on sensors and computer software is operation of a vehicle in an autonomous mode, a semi-autonomous mode, or a non-autonomous mode. Vehicles will be used herein as examples of mobile systems, however, the techniques described herein can be applied to other mobile systems including robots or drones, for example.

Development of mobile system hardware and software can be aided by a simulation. A simulation is a system that duplicates software and/or hardware included in a mobile system on computer systems. Sensor data can be acquired from sensors included in a mobile system and input to the simulation. Output from the simulation can be compared to outputs from the hardware and software included the mobile system. The simulation can include software that simulates the mobile system or can include a copy of the mobile system hardware and software in a test environment. A software simulation can achieve the same results as a hardware/software simulation, but a hardware/software simulation can also include timing data to duplicate real time operation of the mobile system.

Development of mobile systems using simulations can require a large amount of test data. Acquiring a large amount of test data from mobile system sensors can include transmitting sensor data wirelessly from a large number of mobile systems to laboratory facilities via edge computers and servers. Test data from mobile system sensors can require a large amount of wireless network bandwidth and a large amount of digital storage at server computers and laboratory computers. Simulations are hardware and software systems that mimic the operation of hardware and software that control operation of a mobile system. Simulating mobile system control hardware and software in a laboratory can enhance development of the control hardware and software by permitting more efficient updating and testing of the hardware and software. Simulations can be a model-in-the-loop (MIL), where a high level model of the entire mobile system is simulated in software to validate the control processes. A software-in-the-loop (SIL) simulation can be generated from the MIL simulation and can be used to generate software to be executed on the mobile system. A hardware-in-the-loop (HIL) simulation duplicates the hardware included in the mobile system and can be used to test actual system timing, for example. Simulations can be open loop, where a single set of inputs is input to the simulation to generate a single set of outputs, and closed loop, where outputs from the simulation are fed back to the inputs to permit simulation of continuous operation of the system being simulated.

A reason for acquiring large amounts of data is that a high fidelity simulation that mimics a with high resolution in time and output data can require a large amount of input data. A first reason for this is that typically, control algorithms rely on statefullness to determine results. Statefullness is when a hardware or software algorithm uses internally stored data typically determined based on previous execution of the algorithm. Simulations can sometimes be configured to supply statefullness data without previous execution of the algorithm on realistic data, however, this is not always possible or efficient. For example, a simulation can include vendor-supplied routines that are not internally accessible, e.g., "blackboxes." Simulations can also include inputs from other system components that are not being simulated but influence results. Determining statefullness for these system components could unnecessarily complicate the simulation task beyond simply increasing the amount of data input to the simulation.

Another reason for acquiring large amounts of test data is that mobile systems and simulations of mobile systems can require several seconds of continuously applied test data before results stabilize. Results stabilizing means to output correct results based on the input test data. For example, bandwidth and storage limitations can limit test data acquisition to two seconds of continuous sensor data acquisition from mobile systems, while some mobile systems can require up to ten seconds of continuous input data to output stable results. An unstructured data collection system as described herein can enhance mobile system simulation by generating several seconds of simulated test data and prepending it to acquired test data to permit a mobile systems simulation to achieve stable output results without requiring additional network bandwidth and/or computer resources due to increased complexity of data collection.

Disclosed herein is a method, including acquiring real world sensor data from a mobile platform for a first time period and inputting the real world sensor data from the mobile platform to a first neural network to predict sensor data of the mobile platform for a second time period that is prior to the first time period. The predicted sensor data and the real world sensor data can be input to a simulation of the mobile platform and the simulation can output predicted real world operation of the mobile platform based on the predicted sensor data for the second time period and the real world sensor data for the first time period. The first neural network can be trained by comparing the predicted real world operation of the mobile platform output from the simulation to observed real world operation of the mobile platform. The predicted real world operation of the mobile platform output from the simulation can be compared to observed real world operation of the mobile platform includes determining a loss function. The simulation can be transmitted to a second mobile platform for real world operation. The first neural network can be trained using ground truth sensor data acquired from the mobile platform over a third time period greater than and including the first time period.

The simulation of the mobile platform can achieve stable performance based on the real world sensor data and the predicted sensor data. Second real world sensor data can be acquired over a third time period, wherein the second real world data is input to a second neural network that outputs latent variables; and wherein the latent variables are input to the first neural network with the real world sensor data from the mobile platform. The simulation can include a second neural network. The mobile platform can be a vehicle. The real world sensor data can include one or more of video data, radar data, vehicle controller area network data, or vehicle engine control unit data. The first neural network can predict sensor data of the mobile platform for a second time period that is after to the first time period. The first neural network can predict sensor data of the mobile platform for a second time period that is within the first time period. The real world sensor data can be acquired in response to an event. The real world sensor data can be acquired at a random time.

Further disclosed is a computer readable medium, storing program instructions for executing some or all of the above method steps. Further disclosed is a computer programmed for executing some or all of the above method steps, including a computer apparatus, programmed to acquire real world sensor data from a mobile platform for a first time period and input the real world sensor data from the mobile platform to a first neural network to predict sensor data of the mobile platform for a second time period that is prior to the first time period. The predicted sensor data and the real world sensor data can be input to a simulation of the mobile platform and the simulation can output predicted real world operation of the mobile platform based on the predicted sensor data for the second time period and the real world sensor data for the first time period. The first neural network can be trained by comparing the predicted real world operation of the mobile platform output from the simulation to observed real world operation of the mobile platform. The predicted real world operation of the mobile platform output from the simulation can be compared to observed real world operation of the mobile platform includes determining a loss function. The simulation can be transmitted to a second mobile platform for real world operation. The first neural network can be trained using ground truth sensor data acquired from the mobile platform over a third time period greater than and including the first time period.

The instructions can include further instructions wherein the simulation of the mobile platform achieves stable per-
formance based on the real world sensor data and the predicted sensor data. Second real world sensor data can be acquired over a third time period, wherein the second real world data is input to a second neural network that outputs latent variables; and wherein the latent variables are input to the first neural network with the real world sensor data from the mobile platform. The simulation can include a second neural network. The mobile platform can be a vehicle. The real world sensor data can include one or more of video data, radar data, vehicle controller area network data, or vehicle engine control unit data. The first neural network can predict sensor data of the mobile platform for a second time period that is after to the first time period. The first neural network can predict sensor data of the mobile platform for a second time period that is within the first time period. The real world sensor data can be acquired in response to an event. The real world sensor data can be acquired at a random time.

FIG. 1 is a diagram of a system 100 that can include a traffic infrastructure node 105 that includes a server computer 120. System 100 includes a mobile system, which in this example is a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a powertrain controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. As discussed above, techniques discussed herein for data acquisition for simulations will also apply to controls for other systems such as unmanned arial vehicles (UAVs), motorcycles, and mobile robots, for example. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in autonomous, semi-autonomous, or manual modes. By a semi- or fully-autonomous mode, we mean a mode of operation wherein a vehicle can be piloted partly or entirely by a computing device as part of a system having sensors and controllers. For purposes of this disclosure, an autonomous mode is defined as one in which each of vehicle propulsion (i.e., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer. In a semi-autonomous mode, some but not all of them are controlled by a computer.

A traffic infrastructure node 105 can include a physical structure such as a tower or other support structure (i.e., a pole, a box mountable to a bridge support, cell phone tower, road sign support, etc.), upon which server computer 120 can be mounted, stored, and/or contained, and powered, etc. One traffic infrastructure node 105 is shown in FIG. 1 for ease of illustration, but the system 100 could and likely would include tens, hundreds, or thousands of traffic infrastructure nodes 105. The traffic infrastructure node 105 is typically stationary, i.e., fixed to and not able to move from a specific geographic location.

Server computer 120 typically has features in common with the vehicle 110 V2X interface 111 and computing device 115, and therefore will not be described further to avoid redundancy. Although not shown for ease of illustration, the traffic infrastructure node 105 also includes a power source such as a battery, solar power cells, and/or a connection to a power grid. A traffic infrastructure node 105 server computer 120 can receive sensor 116 data from vehicle 110 computing device 115. Sensors 116 can acquire data regarding an environment around a vehicle 110 or data regarding internal states of vehicle 110.

Figure 2:
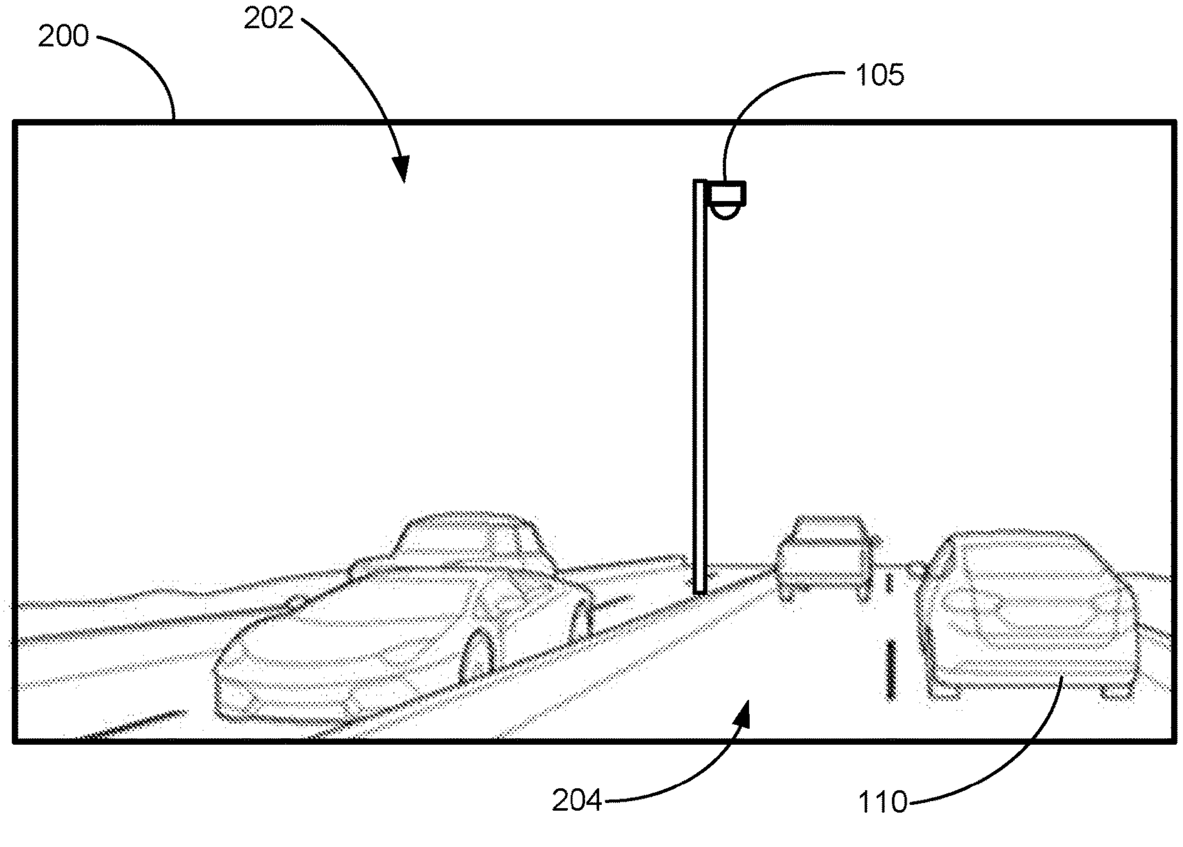
FIG. 2 is a diagram of an example traffic scene including a traffic infrastructure node.

FIG. 2 is a diagram of a traffic scene 200. Traffic scene 200 includes a vehicle 110 as it operates on a roadway 204. Vehicle 110 can also operate in a parking lot or on pavement included in a parking garage or other structure. Traffic scene 200 can also include other vehicles 202. As discussed above in relation to FIG. 1, a vehicle 110 can include one or more sensors 116 that acquire data regarding an environment around the vehicle 110. Vehicle 110 can include variety of sensors 116 including one or more of a lidar sensor, a radar sensor, or an ultrasound sensor to acquire data regarding an environment around the vehicle 110. Vehicle 110 can also include sensors 116 including GPS and inertial measurement units (IMUs) that detect vehicle 110 location and orientation with respect to a global coordinate system such as latitude, longitude and altitude. Vehicle 110 can also include sensors 116 that detect vehicle 110 states such as speed, lateral and longitudinal accelerations and various operating conditions related to vehicle powertrain, steering and brakes, for example.

A computing device 115 can acquire data from sensors 116 and use the acquired data to operate the vehicle 110. The real world sensor data can include one or more of video data, radar data, vehicle controller area network data, or vehicle engine control unit data. Computing device 115 can detect objects including other vehicles 202, pedestrians, etc. and determine a vehicle trajectory upon which to operate the vehicle 110. A vehicle trajectory can be a polynomial function that includes vehicle 110 speed and direction. Changes in vehicle 110 speed and direction include in the vehicle trajectory can describe vehicle lateral and longitudinal accelerations as is operates on the vehicle trajectory. Data acquired from sensors 116 by computing device 115 can be communicated by computing device to a server computer 120 in a traffic infrastructure node 105 as the vehicle 110 operates on a roadway 204. A server computer 120 can acquire sensor 116 data from a plurality of vehicles 110, 202 and forward the acquired sensor 116 data to a laboratory computer that stores sensor 116 data from a plurality of vehicles. In addition to sensor 116 data, a computing device 115 in a vehicle 110 can store and communicate to a server computer 120 data regarding results of processing the sensor 116 data, for example vehicle trajectories determined based on the sensor data 116.

Figure 3:
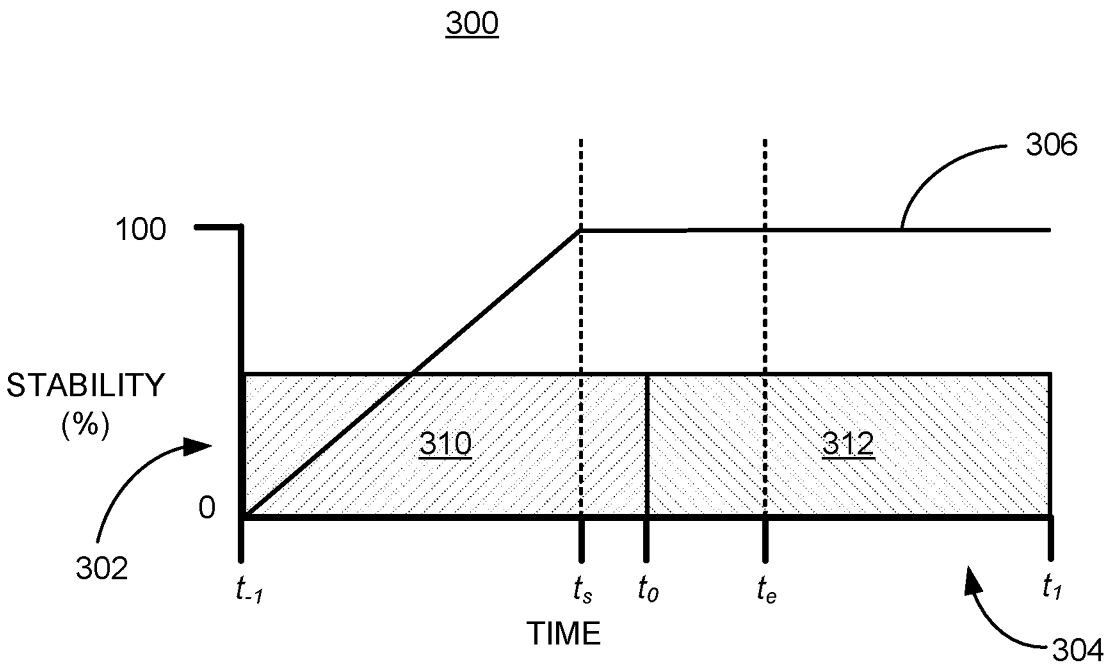
FIG. 3 is a diagram of an example graph of simulation stability graph of simulation stability.

FIG. 3 is a diagram of a graph 300 illustrating simulation system stability for a simulation system that acquires real world sensor 116 data and simulates operation of advanced driver assist systems (ADAS) hardware and software included in a computing device 115. Development of ADAS hardware and software can be an iterative process, where prototype hardware and software can be tested on real world data acquired by sensors 116 included in a vehicle. When updates are made to the ADAS, a vehicle 110 that includes the updated ADAS would have to be operated on the roadways under a variety of lighting, weather and traffic conditions to determine results to compare with previous results. Using a simulation system can enhance development of ADAS by permitting updates to be tested using an acquired database of real world sensor 116 data to produce results that can be compared to previous results without requiring operation of a vehicle 110.

In other examples, test data may also be saved intermittently around an ADAS event rather than being saved continuously, or a data recorder may lose some data before an ADAS event. In yet other examples, or due to the experimental nature of the vehicle 110 hardware and software, there may be some corruption in the acquired data set. In all of these examples, techniques discussed herein for generating data for simulations based on acquired data can be used to backfill data sets and enhance datasets for input to simulation hardware and software.

Development of ADAS hardware and software using a simulation system can require a very large volume of real world data sets. For example, ADAS hardware and software can include neural networks that can require hundreds of thousands of images to train. Acquiring and storing large volumes of real world data sets used to develop ADAS hardware and software using a simulation system can require large amounts of network bandwidth to transfer the data from vehicles 110 operating in the real world and large amounts of computer memory to store the real world data. Limits are placed on the amount of data acquired to place reasonable limits on the amount of network bandwidth and computer memory used in acquiring the real world data. In other examples, an ADAS manufacturer may produce a stable version of hardware software and would like to continuously monitor and enhance ADAS performance over time using end user data shared to the ADAS manufacturer upon feature activation or similar events of interest.

A technique for limiting network bandwidth and computer memory used in acquiring real world data from vehicles 110 is to repeatedly record a limited number of seconds of data, for example five seconds, in a computing device 115 included in a vehicle 110. When an ADAS event occurs, the output from the ADAS hardware and software and the five seconds of sensor 116 data currently being recorded can be uploaded to a server computer 120 included in a traffic infrastructure node 105 by the computing device 115. Events that can trigger the upload are events that indicate an operation of the vehicle 110 ADAS, i.e., an ADAS event, in response to sensor 116 data. In other examples, random samples can be acquired, or samples can be acquired based on other operations of the vehicle. For example, an ADAS event can be a lane change, vehicle braking or acceleration, or other changes in a vehicle 110 trajectory due to traffic or roadway conditions. In this fashion, a simulation system can operate with the same input data that the vehicle ADAS had as input and output results that can be compared with the uploaded results from the vehicle ADAS.

As new ADAS hardware and software is developed, the algorithms included in ADAS hardware and software can change, causing the time duration of sensor data required to reach stable output results to change. As a result, the time duration of real world sensor data included in the test database for some ADAS events may not be of sufficient length to permit the new simulation system to achieve stable results For example, a new algorithm can cause a simulation system for simulating ADAS events to require between five and ten seconds to stabilize, while the system that acquires and stores the real world sensor 116 data only acquires five seconds of data per ADAS event. Graph 300 illustrates simulation system stability based on acquired sensor data 312. Graph 300 plots percent simulation stability 302 on the y axis versus time 304 on the x axis. Simulation stability 302 is presented in percentages from 0 to 100 to illustrate probabilities that a simulation system would output a correct result based on the length of time sensor 116 data is input to the simulation system.

Graph 300 represents a computing device 115 vehicle 110 acquiring real world data 312 starting at time $t_0$ and ending at time $t_1$. During the interval from time $t_0$ to time $t_1$, an ADAS event occurs at time $t_e$. A computing device 115 in the vehicle 110 transmits the real world data 312 and the ADAS event that occurred at time $t_e$ to a server computer 120 included in a traffic infrastructure node 105. The server computer 120 can forward the real world data 312 and the ADAS event to be stored at a computer included in a development or laboratory facility, for example. The development of laboratory computer can include the simulation hardware and/or software system that simulates the ADAS hardware and/or software included in the vehicle 110.

Inputting the real world data 312 to the simulation system without modification can cause erroneous results to be output from the simulation system. Graph 300 includes a stability curve 306 that illustrates the probability that a simulation will output correct results based on the duration of the input data. A simulation system can require input data for a time period greater than or equal to the time from $t_{-1}$ to $t_s$ on graph 300. A time, for example time $t_0$, is a point in time, whereas a time period is a duration between times, for example the time period between times $t_0$ and $t_e$. Recording a limited time period of real world data indicated by an event occurring at time $t_e$, using real world data only would limit the simulation system to inputting data from the time period from $t_0$ to $t_e$ on graph 300. This can be less than the time period $t_{-1}$ to $t_s$ required to reach 100% stability, meaning that a simulation system can output erroneous results based on this limited data. Techniques discussed herein enhance simulation systems by using a data prediction system to generate predicted data 310 that can be prepended to the real world data 312 and inputting both the predicted data 310 and the real world data 312 to the simulation system to increase the probability that the simulation system will reach stability and output accurate data regarding an ADAS event.

Predicted data 310 can be generated by inputting real world data 312 to a trained neural network. The type of neural network employed is a function of the type of real world data to be predicted. Real world data that includes a series of numbers, such as GPS locations, velocities, or lateral or longitudinal accelerations can be predicted using a neural network that includes layers of fully connected neurons that can encode the input data as latent variables and then decode the latent variables into predicted data. Real world data that include image data such as video sequences can encode the input data with input convolutional layers that encode the input image data into latent variables and output convolutional layers that decode the latent variables into predicted images.

Neural networks that generate predicted data can be trained by acquiring lengths of real world training data for durations that equal a duration of the data to be predicted data 310 plus the real world data 312. Each length of training data is divided into a first portion to be used as ground truth and a second portion to be used as input to the neural network. The second portion is input to the neural network to generate predicted data that precedes the second portion. The neural network can be trained by comparing the predicted data to the acquired first portion to determine a loss function that can be backpropagated through the neural network. Backpropagation is when a loss function value is input to the layers of a neural network starting at the output layers and proceeding to the input. A plurality of second portions of the training data can be processed by the neural network a plurality of iterations while varying the weights that program the operation of the layers included in the neural network. For each iteration the second portion of training data is input to the neural network and the results are compared to the first portion ground truth to determine a loss function to be backpropagated through the neural network. Backpropagation selects a set of weights that produce a minimal loss function that can be saved as the weights included in the trained neural network. This process can be repeated for a plurality of real world training data portions to train the neural network.

Figure 4:
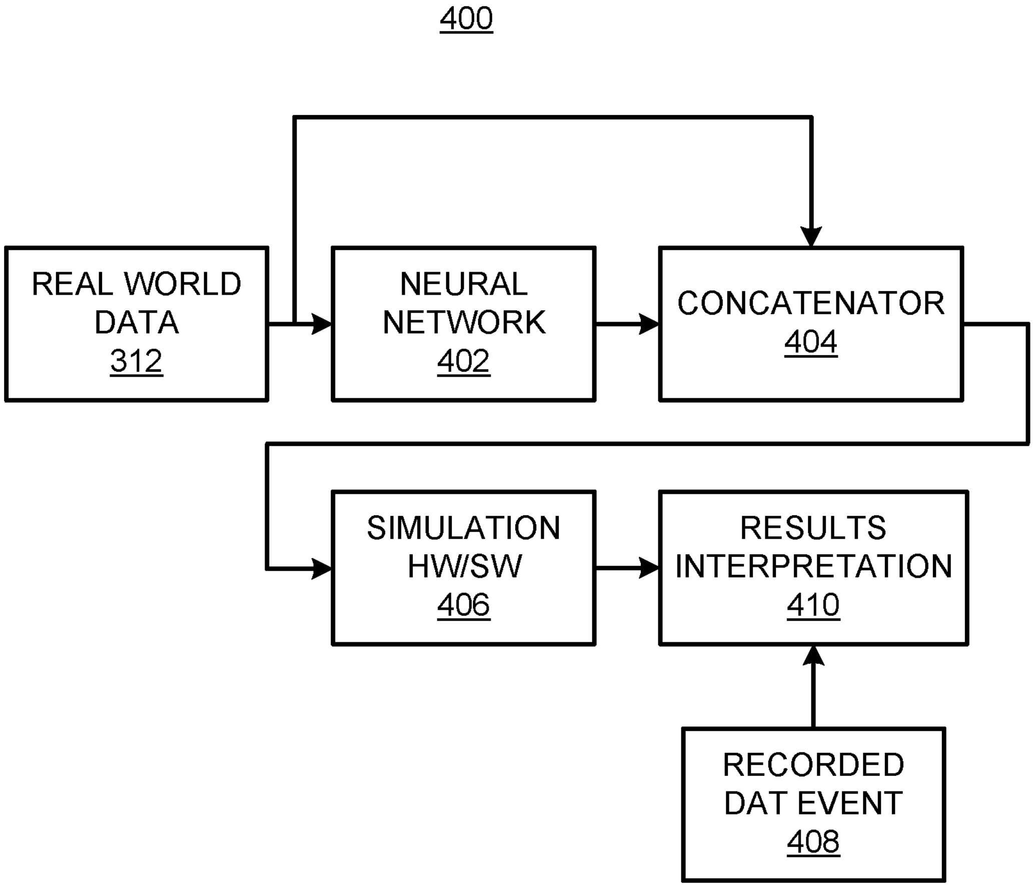
FIG. 4 is a diagram of an example system to enhance simulation stability.

FIG. 4 is a diagram of a simulation system 400. Simulation system 400 simulates operation of vehicle 110 ADAS hardware and software included in a computing device 115 that inputs sensor 116 data and outputs ADAS data used by computing device 115 to determine a vehicle trajectory. Simulation system 400 inputs real world data 312 acquired from a vehicle 110. As discussed above in relation to FIG. 3, the real world data 312 can be a few seconds of sensor 116 data recorded by a computing device 115 in a vehicle and communicated to a server computer 120 in a traffic infrastructure system 105 along with an ADAS event that was determined by the computing device 115 in response to the sensor 116 data. The server computer 120 can include the real world data 312 and the ADAS event in a database that includes real world data 312 and ADAS events from a plurality of vehicles 110. Additionally, or alternatively, the server computer 120 can forward the real world data 312 and the ADAS event to a laboratory or development computer system at another location, for example where ADAS hardware and software is developed.

Real world data 312 can be retrieved from a database and input to simulation system 400. As discussed above, due to constraints imposed by network bandwidths and storage limitations, the number of seconds of real world data 312 can be insufficient to permit the Simulation system 400 to achieve stability as discussed above in relation to FIG. 3. To permit the Simulation system 400 to achieve stability, the real world data 312 is input to a neural network 402. Neural network inputs the real world data 312 and generates predicted data 310. The generated predicted data 310 is output to a concatenator 404 which prepends or concatenates the predicted data 310 to the real world data 312. The combined predicted data 310 and real world data 312 is input to simulation hardware and/or software 406.

Simulation hardware and/or software 406 inputs the combined predicted data 310 and real world data 312 and determines an ADAS event. For example, the combined predicted data 310 and real world data 312 can include radar data that indicate that a vehicle 110 is approaching another vehicle traveling ahead of a vehicle 110 in the same traffic lane. A rate at which the vehicle 110 closing on a leading vehicle can be determined by the relative velocities of the two vehicles. Depending upon the rate at which the vehicle 110 is determined to be closing on the leading vehicle, a determined ADAS event can be a command to decelerate forward motion or apply braking or both. The determined ADAS event can be recorded by a computing device 115 in vehicle 110 and output to a server computer 120 as a recorded ADAS event 408. AN ADAS event determined by simulation hardware/software 406 can be output to results interpretation 410 where it can be compared to a recorded ADAS event 408 that was recorded and uploaded to server computer 120 along with the real world data 312. The results interpretation 410 can determine whether an update to the simulation hardware and/or software 406, enhances, does not change, or degrades the performance of the simulation hardware and/or software, for example. Simulation system 400 enhances the operation of simulation hardware and/or software 406 by permitting the simulation hardware and/or software to reach stability, and therefore output accurate results, despite limitations in network bandwidth and computer storage.

Figure 5:
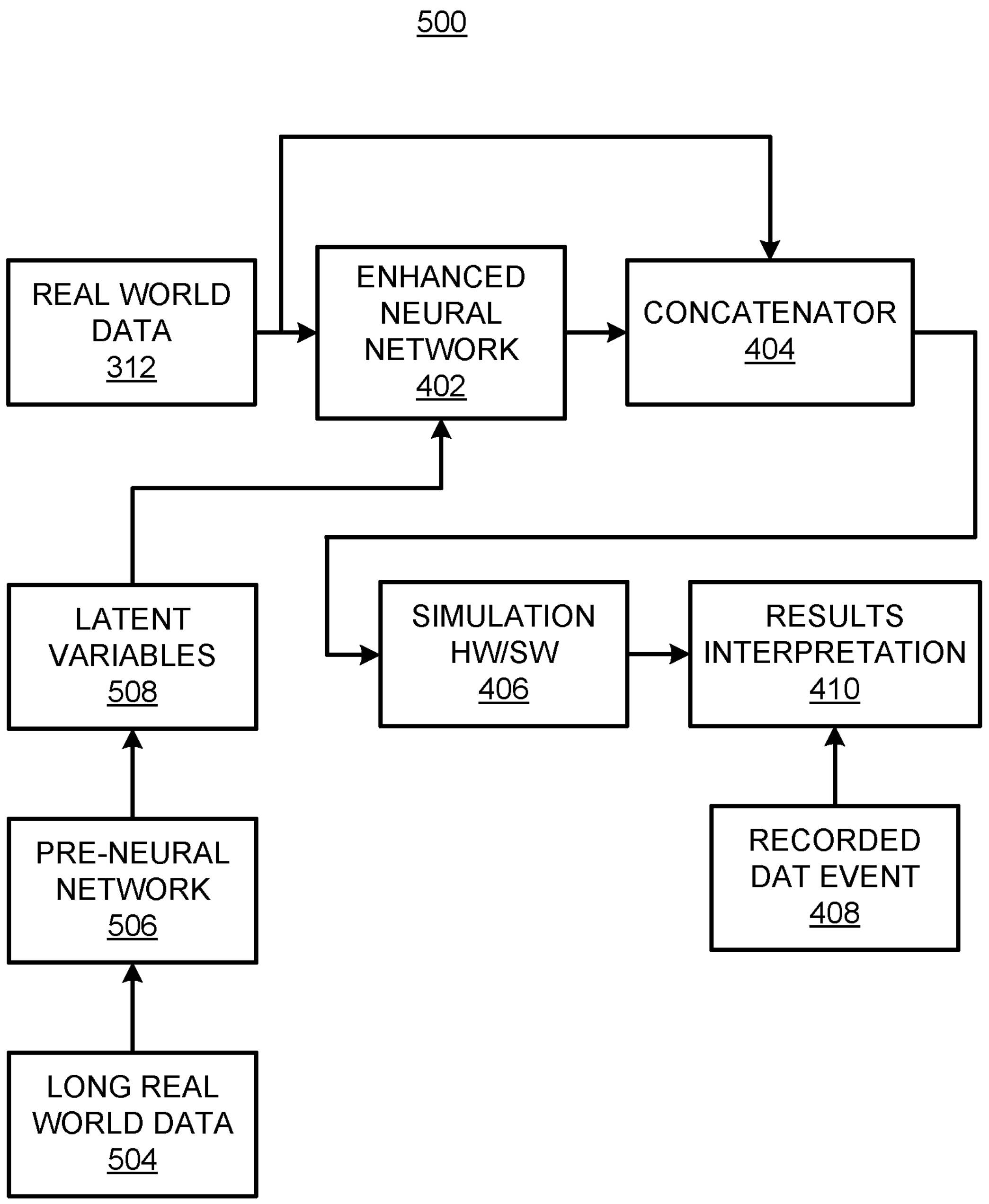
FIG. 5 is a diagram of an example system to further enhance simulation stability.

FIG. 5 is a diagram of a modified simulation system 500. Modified simulation system 500 includes an enhanced neural network 502. Enhanced neural network 502 inputs latent variables 508 determined by a pre-neural network 506 based on encoding long duration real world data 504. Long duration real world data 504 can include sequences of sensor 116 data acquired from vehicles 110 for up to 30 seconds. Processing long duration real world data 504 can permit the pre-neural network to generate latent variables. The latent variable can be output to the enhanced neural network 502 to be combined with the latent variables, i.e., variables generated and/or used internally in the enhanced neural network 502, to enhance the accuracy of the prediction output from the neural network 502 and provide enhanced stability of the simulation system 400. In other examples, latent variables generated by the enhanced neural network 502 can be stored and selected based on the accuracy of the simulation hardware and/or software 406 as indicated by the results interpretation. The selected latent variables can be stored and input as latent variables 508 to the enhanced neural network in addition to or instead of the latent variables 508 generated by pre-neural network 506.

Inputting latent variables 508 to an enhanced neural network 502 can enhance the operation of the modified simulation system 500 by permitting shorter duration real world data 312 than the real world data 312 input to simulation system 400. Combining latent variables 508 generated by using long duration real world data segments or selecting latent variables 508 based on performance can permit an enhanced neural network 502 to generate predicted data 310 using shorter time duration real world data 312. Using shorter duration real world data 312 can permit more real world data 312 to be gathered for given network bandwidth and computer storage reducing system complexity.

Figure 6:
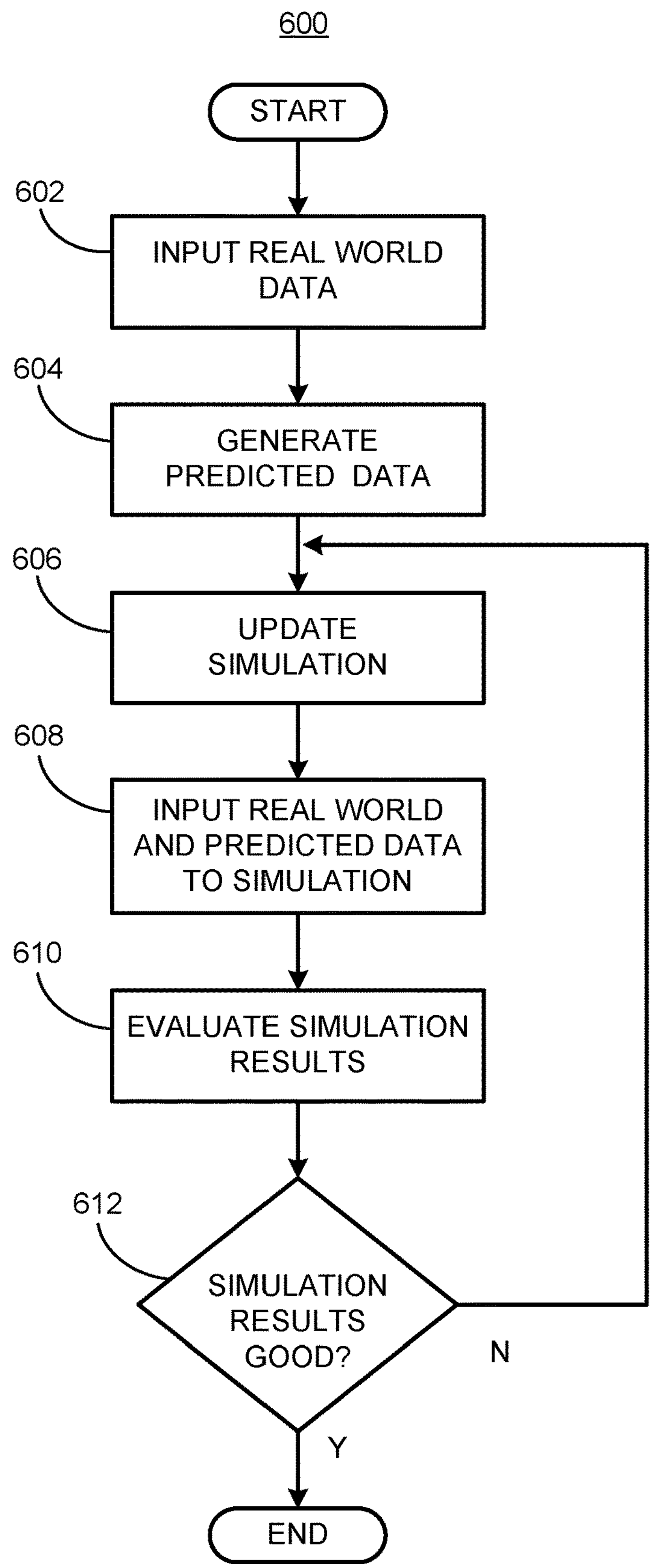
FIG. 6 is a flowchart diagram of an example process to test and enhance a simulation.

FIG. 6 is a flowchart, described in relation to FIGS. 1-6 of a process 600 for updating ADAS hardware and/or software using a simulation hardware and/or software 406. Process 600 can be implemented by a processor of a server computer 120 or a laboratory computer, taking as input images acquired from sensors 116, executing commands, and outputting simulation results. Process 600 includes multiple blocks that can be executed in the illustrated order. Process 600 could alternatively or additionally include fewer blocks or could include the blocks executed in different orders.

Process 600 begins at block 602, where a simulation system 400 inputs real world data 312 acquired by sensors 116 included in a vehicle 110. The real world data 312 can be stored in memory included in a server computer 120 or laboratory computer as discussed above in relation to FIGS. 3 and 4.

At block 604 the simulation system 400 generates predicted data 310 by inputting the real world data 312 into a neural network trained to predict data as discussed in relation to FIGS. 3, 4, and 5, above. The predicted data 310 is prepended to the real world data 312 to form data with a duration equal to the length of the real world data 312 and the predicted data 310.

At block 606 the simulation hardware and/or software 406 is updated. Updates typically seek to enhance performance of the simulation hardware and/or software 406 including permitting the simulation hardware and/or software to handle addition types of input data included in the real world data 312.

At block 608 the combined predicted data 310 and the real world data 312 is input to the updated simulation hardware and/or software to generate an ADAS event. The simulation hardware and software that simulated operation of the mobile platform can achieve stable performance based on the combined real world sensor data and the predicted sensor data. As discussed above, an ADAS event can be passed to a computing device 115 in a vehicle 110 to determine a vehicle trajectory.

At block 610 the simulation system 400 can evaluate the output ADAS event to determine whether the ADAS event output by the updated simulation hardware and/or software 406 agrees with an ADAS event included with the real world data 312. Agreement in this context means that simulation hardware and/or software 406 detected an object in the real world data 312 and generated an ADAS event to signal the object detection before the ADAS event generated by the computing device 115 in the vehicle. Non-agreement means that the simulation hardware and/or software 406 does not generate an ADAS event to signal the object detection before the ADAS event generated by the computing device.

At block 612, the results of the comparison are tested to determine whether the simulation hardware and/or software 406 have passed the comparison of the block 610 to determine whether there is agreement or non-agreement. In examples where there is non-agreement, process 600 can return to block 606 to revise the update and run the simulation hardware and/or software 406 again with the new update. In examples where agreement is determined, process 600 ends following block 612.

Figure 7:
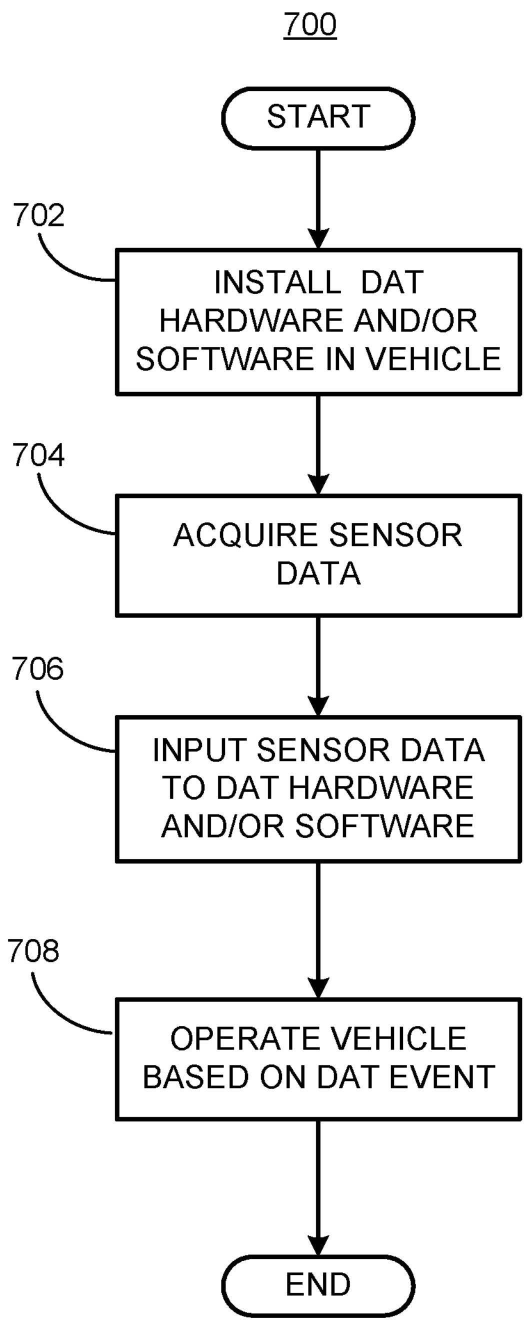
FIG. 7 is a flowchart diagram of an example process to operate a vehicle based on a simulation.

FIG. 7 is a flowchart, described in relation to FIGS. 1-6 of a process 700 for operating a vehicle 110 based on ADAS hardware and/or software. Process 700 can be implemented by a processor of a computing device 115, taking as input sensor 116 data, executing commands, and operating a vehicle 110. Process 700 includes multiple blocks that can be executed in the illustrated order. Process 700 could alternatively or additionally include fewer blocks or can include the blocks executed in different orders.

At block 702 process 700 installs ADAS hardware and/or software in a computing device 115 included in a vehicle 110. The ADAS hardware and/or software is the simulation hardware and/or software 406 determined by process 600 to correctly process real world data 312. The ADAS hardware and/or software can be removed from the simulation system 400 and installed in a computing device 115 included in a vehicle 110. In some examples, the computing device 115 has enough computing resources to run the ADAS as software alone. In other examples, hardware is added to enhance the computing resources of the computing device 115 to permit the ADAS to execute in real time.

At block 704 computing device 115 acquires real world data from sensors 116 included in the vehicle 110. There is no requirement to predict data to prepend to the real world data because there is no restriction on acquiring real world data. Because there is no need to transmit or store the data, real world data can be continuously input to the ADAS hardware and/or software.

At block 706 computing device 115 inputs the sensor 116 data to the ADAS hardware and/or software. The ADAS hardware and/or software will reach stability shortly after startup and continue in stable operation as long as the sensor 116 data is being acquired and input to the ADAS hardware and/or software. The default implementation of this technique is pre-data extrapolation, e.g., the generated data is inserted before the acquired data. Other implementations can include data interpolation, where the data is inserted in the acquired data, and post-data extrapolation, where the generated data is inserted after the acquired. The ADAS hardware and/or software will output ADAS events based on the input sensor 116 data.

At block 708 process 00 operates the vehicle 110 based on ADAS events output from the ADAS hardware and/or software. Computing device 115 can determine vehicle trajectories based on the ADAS events. Vehicle trajectories can include lateral and longitudinal accelerations that maintain vehicle 110 positions in traffic, including lane changes. Other examples of vehicle trajectories include avoiding objects, parking, or following traffic signals. Computing device 115 can operate the vehicle 110 on a vehicle trajectory by commanding controllers 112, 113, 114 to operate vehicle powertrain, vehicle steering and vehicle brakes. Following block 606 process 600 ends Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:

a computer that includes a processor and a memory, the memory including instructions executable by the processor to:

acquire real world sensor data from a mobile platform for a first time period;

input the real world sensor data from the mobile platform to a first neural network to predict sensor data of the mobile platform for a second time period that is prior to the first time period wherein the predicted sensor data from the second time period is generated by the first neural network and wherein the real world sensor data acquired from the mobile platform is limited to the first time period; and;

input the predicted sensor data and the real world sensor data to a simulation of the mobile platform;

wherein the simulation outputs predicted real world operation of the mobile platform based on the predicted sensor data for the second time period and the real world sensor data for the first time period.

2. The system of claim 1, wherein the first neural network is trained by comparing the predicted real world operation of the mobile platform output from the simulation to observed real world operation of the mobile platform.

3. The system of claim 2, wherein comparing the predicted real world operation of the mobile platform output from the simulation to observed real world operation of the mobile platform includes determining a loss function.

4. The system of claim 1, wherein the simulation is transmitted to a second mobile platform for real world operation.

5. The system of claim 1, wherein the first neural network is trained using ground truth sensor data acquired from the mobile platform over a third time period greater than and including the first time period.

6. The system of claim 1, wherein the simulation of the mobile platform achieves stable performance based on the real world sensor data and the predicted sensor data.

7. The system of claim 1, wherein the second real world sensor data is acquired over a third time period, wherein the second real world sensor data is input to a second neural network that outputs latent variables; and wherein the latent variables are input to the first neural network with the real world sensor data from the mobile platform.

8. The system of claim 1, wherein the simulation includes a second neural network.

9. The system of claim 1, wherein the mobile platform is a vehicle.

10. The system of claim 1, wherein the real world sensor data includes one or more of video data, radar data, vehicle controller area network data, or vehicle engine control unit data.

11. A method, comprising:

acquiring real world sensor data from a mobile platform for a first time period;

inputting the real world sensor data from the mobile platform to a first neural network to predict sensor data of the mobile platform for a second time period that is prior to the first time period wherein the predicted sensor data from the second time period is generated by the first neural network and wherein the real world sensor data acquired from the mobile platform is limited to the first time period; and;

inputting the predicted sensor data and the real world sensor data to a simulation of the mobile platform;

wherein the simulation outputs predicted real world operation of the mobile platform based on the predicted sensor data for the second time period and the real world sensor data for the first time period.

12. The method of claim 11, wherein the first neural network is trained by comparing the predicted real world operation of the mobile platform output from the simulation to observed real world operation of the mobile platform.

13. The method of claim 12, wherein comparing the predicted real world operation of the mobile platform output from the simulation to observed real world operation of the mobile platform includes determining a loss function.

14. The method of claim 11, wherein the simulation is transmitted to a second mobile platform for real world operation.

15. The method of claim 11, wherein the first neural network is trained using ground truth sensor data acquired from the mobile platform over a third time period greater than and including the first time period.

16. The method of claim 11, wherein the simulation of the mobile platform achieves stable performance based on the real world sensor data and the predicted sensor data.

17. The method of claim 11, wherein the second real world sensor data is acquired over a third time period, wherein the second real world sensor data is input to a second neural network that outputs latent variables; and wherein the latent variables are input to the first neural network with the real world sensor data from the mobile platform.

18. The method of claim 11, wherein the simulation includes a second neural network.

19. The method of claim 11, wherein the mobile platform is a vehicle.

20. The method of claim 11, wherein the real world sensor data includes one or more of video data, radar data, vehicle controller area network data, or vehicle engine control unit data.

* * * * *